Oct. 24, 1967  W. F. OLASHAW  3,349,291
PREFABRICATED SWITCHBOARD CONSTRUCTION
Filed April 12, 1965  2 Sheets-Sheet 1

INVENTOR.
WILLIAM F. OLASHAW
BY
Robert F. Casey
ATTORNEY

Oct. 24, 1967  W. F. OLASHAW  3,349,291
PREFABRICATED SWITCHBOARD CONSTRUCTION
Filed April 12, 1965  2 Sheets-Sheet 2

INVENTOR.
WILLIAM F. OLASHAW
BY Robert T. Casey
ATTORNEY

United States Patent Office 3,349,291
Patented Oct. 24, 1967

3,349,291
PREFABRICATED SWITCHBOARD
CONSTRUCTION
William F. Olashaw, New Britain, Conn., assignor to General Electric Company, a corporation of New York
Filed Apr. 12, 1965, Ser. No. 447,335
9 Claims. (Cl. 317—120)

My invention relates to electrical switchboards, and particularly to electrical switchboards of the power type comprising one or more metallic cubicles each containing electrical control devices at the front portion thereof and bussing structure interconnecting the terminals of such devices at the rear thereof to each other and to other incoming and out-going conductors.

Electrical switchboards presently in use are of two general types. The first type comprises switchboards of the "control center" type, comprising one or more metallic cubicles each containing three vertically extending parallel main power supply busbars and a plurality of electrical control devices mounted at the front of the cubicle, each device including a set of three line terminals connected to the main power supply busbars respectively and three load terminals connected either from the back or from the side of the device to outgoing power conductors. The second type comprises switchboards of the type comprising one or more metallic cubicles each having a plurality of electrical control devices mounted at the front thereof and including busbar structures interconnecting the line and load terminals of the control devices at the rear portion of the cubicle in various combinations to each other and to in-coming and out-going conductors.

Switchboards of the first or "control center" type involve relatively simple bussing at the rear thereof. Structure of the type referred to is illustrated, for example, in Patent No. 3,142,003 issued July 21, 1964 and assigned to the same assignee as the present invention. Basically, such structures involve means supporting three main vertical power supply busbars in each cubicle, and a number of control devices each drawing power from the three power supply busbars and having load terminals connected to outgoing conductors. Switchboards of the second type, however, involve vastly more complicated bussing structure. This is because such switchboards require bussing interconnecting the line and load terminals of the control devices in a virtually unlimited number of different combinations.

In accordance with the prior art, electrical switchboards of the second type have been constructed by providing a metallic supporting cubicle and a number of control devices supported therein at the front portion thereof, and busbars making the required interconnections which are specially formed to provide the particular connections desired. In accordance with this construction, the particular busbars required for any given installation must be specially constructed, bent, drilled, etc. Thus each of such switchboards must be "custom-built." This requires substantial time and expense. In addition, since the bussing provided for each of such switchboards is different, it is necessary to calculate the electrical and mechanical characteristics, such as strength, short-circuit resistance, heat dissipation, etc. individually for each of such switchboards. This contributes substantially to the cost of construction of such switchboards, and also increases the possibility of error and the probability of possible malfunctioning or failure.

It is an object of the present invention to provide an electrical switchboard of the type referred to which can be constructed by the use of largely "standardized" prefabricated parts.

It is another object of the invention to provide an electrical switchboard construction of the type referred to having readily predictable electrical and mechanical characteristics regardless of wide variations in the type of interconnections provided.

It is a further object of the invention to provide an electrical switchboard construction requiring a greatly reduced number of different parts.

It is another object of the invention to provide an electrical switchboard construction having high mechanical strength of the interconnecting busbar structure.

In accordance with the invention, an electrical switchboard construction is provided comprising one or more generally rectangular box-like metallic cubicles each having means for supporting electrical control devices at a front portion thereof, such devices each having three in-coming and three out-going terminals projecting from the back thereof. A prefabricatable electrical bussing structure is further provided at the rear portion thereof comprising a plurality of tiers of vertically extending sets of three busbars each, each of such sets being disposed in the plane parallel to the front of the cubicle at a predetermined location in the cubicle. A set of three horizontally or transversely extending power busbars is further provided at a predetermined location adjacent the rear wall of the cubicle. In addition, prefabricatable adapter busbars are provided, each being formed to connect terminals at a predetermined location to the vertical busbars in a predetermined tier.

In accordance with an important aspect of the invention, the vertically extending busbars comprise busbar conductors having a generally right-angle cross-section, adding strength and providing more flexible connecting facilities and permitting the dimensions of at least one portion of such cross-section to be varied to accommodate different power ratings without altering the connecting facility. In accordance with a further aspect of the invention, the vertically extending busbars each comprise a pair of right-angle cross-section busbars disposed in closely adjacent position.

In accordance with another aspect of the invention, each of the two lengthwise portions of the busbars extending at right-angles to each other, has a lengthwise row of equally spaced holes, which establish predetermined mounting and connecting positions for the electrical devices and for interconnecting bars.

The invention will be more fully understood from the following detailed description, and its scope will be pointed out in the appended claims.

Figure 1:
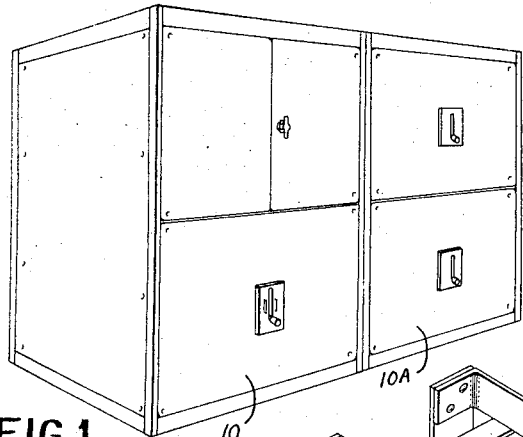
FIGURE 1 is a perspective view of an electrical switchboard of the type incorporating the subject invention.

In the drawings, FIGURE 1 illustrates an electrical switchboard comprising two cubicles 10 and 10A.

Figure 2:
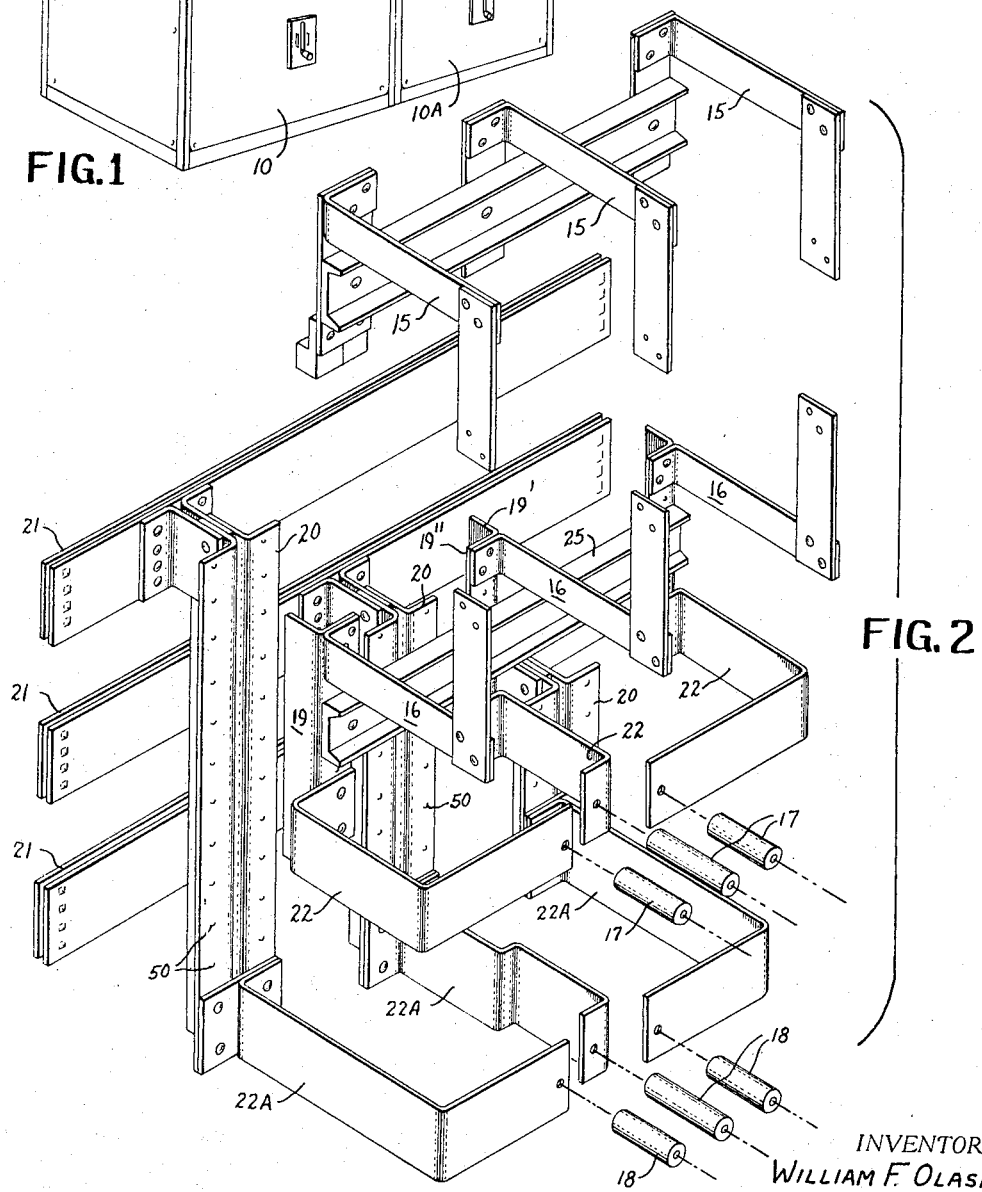
FIGURE 2 is a perspective view of the bussing structure utilized in the form of the invention illustrated in FIGURE 3.
Figure 4:
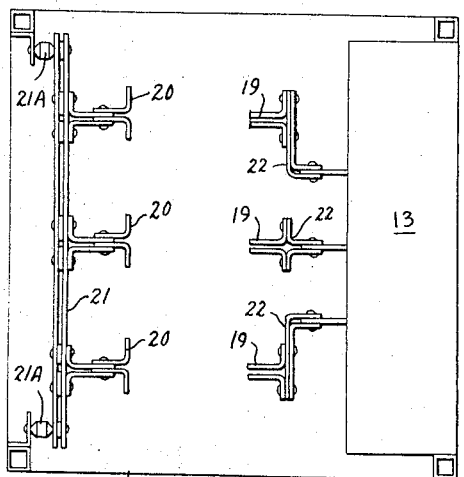
FIGURE 4 is a top plan view of the switchboard of FIGURE 3.
Figure 3:
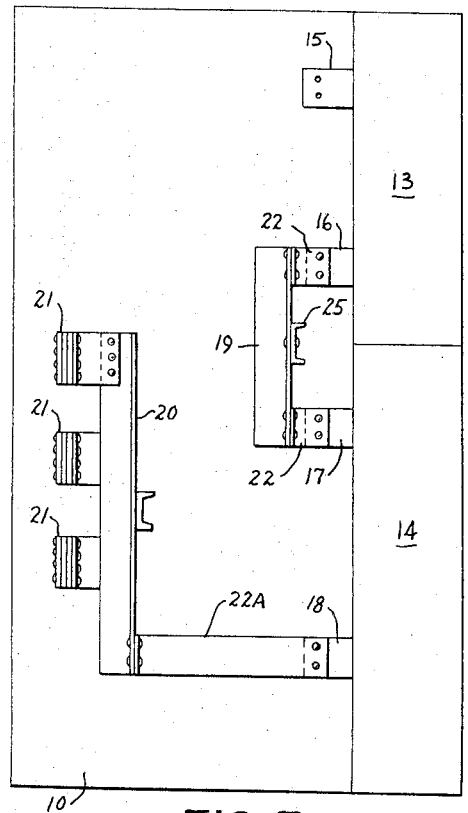
FIGURE 3 is a side elevation view of an electrical switchboard section constructed in accordance with the invention, the side of the cubicle nearest the observer being removed.

In FIGURE 2 there is shown the bussing structure provided in accordance with the invention in one form, the assembly of which is further shown in FIGURES 3 and 4.

Referring to FIGURE 3, the invention is shown as incorporated in an electrical switchboard cubicle 10 having a first electrical device 13 such as a current-transformer, and a second electrical device 14 such as a main circuit breaker supported at the front portion thereof. The current transformer 13 includes a set of three in-coming terminals 15 and a set of three out-going terminals 16 projecting from the rear portion thereof. The main circuit breaker 14 includes a set of three in-coming terminals 17 and a set of three out-going terminals 18 at the rear thereof. In accordance with the invention, a plurality of tiers of vertical busbars 19 and 20 respectively are also provided. Each of the tiers 19 and 20 comprises three pairs of right-angle cross-section busbars as shown particularly in FIGURE 4. A set of three horizontally extending busbars 21 are also provided at the rear portion of the cubicle 10.

In accordance with the invention, the first tier of vertically extending busbars 19 is positioned at a predetermined distance from the back wall of the cubicle. Likewise, the second tier of vertically extending busbars 20 is supported at a second distance from the black wall of the cubicle, behind the first tier or set of busbars.

A plurality of adapter straps 22 are provided for connecting the terminals 16 and 17 of the devices 13 and 14 to the first tier 19, and different adapter straps 22A are provided connecting the terminals 18 to the second tier 20 of vertically extending busbars.

In use, in-coming power supply conductors, not shown, are connected to the terminals 15 of the current transformer compartment 13. The power flow path extends from the terminals 15 through the current transformer 13 to the terminals 16, through the adapter straps 22 to the vertical busbars 19 and to the terminals 17 of the main circuit breaker 14, to the out-going terminals 18, to the adapter straps 22A, to the vertically extending busbars 20, and thence to the horizontally extending busbars 21, which are rigidly supported in the cubicle 10 by suitable insulating means such as stand-off insulators 21A of FIGURE 4.

The vertically extending busbars 19 are mechanically supported with relation to each other by the terminals 16 and 17 and further by means of a generally channel-shaped transverse insulating supporting brace 25. The vertically extending busbars 20 are supported by their connections to the horizontal busbars 21 and the adapter straps 22A and are further supported against transverse movement by a generally channel-shaped transverse insulating brace 25.

Since the vertically extending busbars of the first tier 19 are at a predetermined location, at a distance from the back wall of the cubicle 10, and since the vertically extending busbars 20 are at a predetermined distance from the back wall of the cubicle, and since their spacing is maintained constant, the mechanical and electrical characteristics of the bussing structure can be readily predicted.

Figure 6:
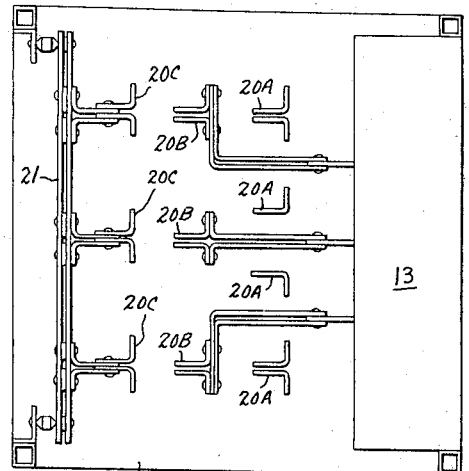
FIGURE 6 is a top plan view of the switchboard of FIGURE 5.
Figure 5:
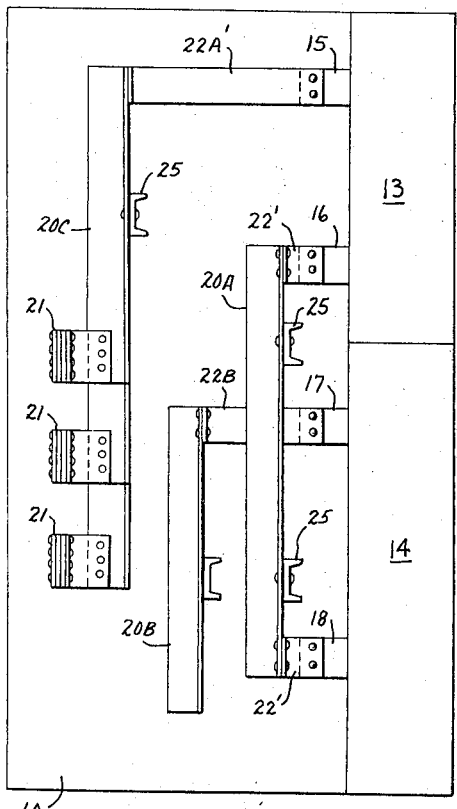
FIGURE 5 is a side elevation view of another embodiment of the invention.

In the embodiment illustrated in FIGURES 5 and 6, three sets or "tiers" of vertical busbars 20A, 20B and 20C are provided. In this arrangement, power is brought in at the lower ends of the vertical busbars 20B through the main circuit breaker 14, through the vertical busbars 20A, to the current transformer compartment 13, and from the terminals 15 of the current transformer compartment to the vertical busbars 20C, and thence to the horizontal busbars 21 previously mentioned. The busbars 20A, 20B, 20C are each braced and tied together by a generally channel-shaped insulating brace members 25.

In this embodiment the adapter straps 22' connecting the terminals 16 and 18 to the vertical bus 20A are identical to the adapter straps 22 of FIGURE 3. The adapter strap 22A' of FIGURE 5, connecting the terminals 15 of the current transformer compartment 13 to the vertical busbars 20C is also identical to the adapter straps 22A of FIGURE 3. A third set of adapter straps 22B is provided connecting the terminals 17 of the main breaker 14 to the second tier busbars 20B.

As shown in the drawings, and particularly in FIGURE 2, the vertical busbars 19, 20, of the FIGURE 3 form, and the vertical busbars 20A, 20B, 20C of the FIGURE 5 form comprise bars having a right-angle cross-section. Each such busbar therefore comprises two lenghwise portions such as 19', 19", see FIGURE 2, each of which is provided with a lengthwise row of equally-spaced pre-punched holes 50 therein.

The right-angle cross-section of these bars provides many advantages in the switchboard bussing structure of the invention. Thus this shape facilitates the making of connections by affording a choice of two connecting surfaces at right-angles to each other. In addition, this shape makes it much easier to make two connections to a given bar at the same vertical level without interfering with each other.

Furthermore, this shape busbar provides improved heat dissipation and accompanying high current carrying capacity. This is especially true when such bars are combined in back-to-back pairs, as in the power supply busbars 19 and 20, see FIGURES 2 and 4.

In addition to these benefits, the angle bars of the present invention have substantially greater mechanical strength and resistance to distortion by high current magnetic forces, reducing the amount of bracing required.

The angle-shaped busbar is also more compact, in that, for a given current capacity, a smaller over-all dimension is required than in the case of a conventional flat type busbar.

It is a further important aspect of the invention that the angle-bar construction described permits variation in the size and therefore the capacity of the vertical busbars without changing the planar location of the connecting surfaces and the location of the spaced connecting holes provided therein. Thus either flange of the right-angle shaped busbar may be extended to increase capacity. Likewise, the thickness of the bar may be varied without changing the location of the connecting surface.

The switchboard construction of the present invention, in addition to its advantages of facilitating the calculation of physical and electrical characteristics, greatly simplifying and shortening time required for assembly, and improved strength, has the further substantial advantage of versatility in that the construction may be readily used to provide any desired interconnections of electrical devices.

This aspect of the invention may best be understood from the following facts. (1) Such switchboards are commonly required to receive two or more of 15 different devices, such as current-transformers, main circuit breakers, "branch" circuit breakers of various sizes, and switches of various types. In addition, each of such devices are provided in at least four different ratings. Each of these different devices, in addition to differing in over-all dimensions, have in-coming and out-going terminals at different locations and spacings.

The aforesaid devices are also required to be interconnected in about 50 different arrangements.

Consequently, in accordance with prior art switchboard construction, about 90,000 different parts, comprising busbar sections, connecting devices, bracing elements, etc. have been required to construct switchboards meeting these requirements. By utilizing the novel switchboard construction of the present invention, however, this number has been reduced to 4,000 parts, or a reduction of over 90%.

While the invention has been described in two particular embodiments, it will be readily apparent that many variations thereof may readily be made, and it is therefore intended by the appended claims to cover all such modifications as fall within the true spirit and scope of the invention.

What I claim as new and desire to secure by Letters Patent of the United States is:

1. A prefabricated electrical switchboard comprising:
   (a) a generally rectangular metallic cubicle having generally planar front and back walls, opposed side walls and top and bottom walls;
   (b) a plurality of electrical devices supported in said cubicle adjacent said front wall, each of said electrical devices having a set of three in-coming terminals and a set of three out-going terminals at the back thereof within said cubicle;
   (c) a first set of three vertical electrical busbars supported in said cubicle and extending substantially perpendicular to said bottom wall in the space between said electrical devices and said back wall substantially in alignment in a plane extending parallel to said front wall;
   (d) a second set of three vertical electrical busbars supported in said cubicle and extending substantially perpendicular to said bottom wall, said second set of busbars being disposed substantially in alignment in a plane extending substantially parallel to said front wall between said first set of vertical busbars and said back wall;
   (e) three first adapter straps of conductive material, said first adapter straps each being bolted at one end to one of said terminals of said devices at one end and being bolted to one of said first set of vertical busbars at the other end;
   (f) three second adapter straps of conductive materials, said second adapter straps each being bolted at one end to one of said terminals of said devices at one end and being bolted to one of said second set of vertical busbars at the other end, whereby at least one of said sets of said device terminals is connected by said adapter straps to one of said first and second sets of vertical busbars.

2. A prefabricated electrical switchboard comprising:
   (a) a generally rectangular metallic cubicle having generally planar front and back walls, opposed side walls and top and bottom walls;
   (b) a plurality of electrical devices supported in said cubicle adjacent said front wall, each of said electrical devices having a set of three in-coming terminals and a set of three out-going terminals at the back thereof within said cubicle;
   (c) a first set of three vertical electrical busbars supported in said cubicle and extending substantially perpendicular to said bottom wall in the space between said electrical devices and said back wall substantially in alignment in a plane extending parallel to said front wall;
   (d) a second set of three vertical electrical busbars supported in said cubicle and extending substantially perpendicular to said bottom wall, said second set of busbars being disposed substantially in alignment in a plane extending substantially parallel to said front wall between said first set of vertical busbars and said back wall;
   (e) three first adapter straps of conductive materials, said first adapter straps each being bolted at one end to one of said terminals of said devices at one end and being bolted to one of said first set of vertical busbars at the other end;
   (f) three second adapter straps of conductive materials, said second adapter straps each being bolted at one end to one of said terminals of said devices at one end and being bolted to one of said second set of vertical busbars at the other end, whereby at least one of said sets of said device terminals is connected by said adapter straps to one of said first and second sets of vertical busbars;
   (g) a set of three horizontal busbars supported in said cubicle and extending substantially perpendicular to said opposed side walls substantially in alignment in a plane extending substantially parallel to said front wall, and
   (h) means connecting said busbars of at least one of said sets of vertical busbars to said busbars of said set of horizontal busbars respectively.

3. A prefabricated electrical switchboard comprising:
   (a) a generally rectangular metallic cubicle having generally planar front and back walls, opposed side walls and top and bottom walls;
   (b) a plurality of electrical devices supported in said cubicle adjacent said front wall, each of said electrical devices having a set of three in-coming terminals and a set of three out-going terminals at the back thereof within said cubicle;
   (c) a first set of three vertical electrical busbars supported in said cubicle and extending substantially perpendicular to said bottom wall in the space between said electrical devices and said back wall substantially in alignment in a plane extending parallel to said front wall;
   (d) a second set of three vertical electrical busbars supported in said cubicle and extending substantially perpendicular to said bottom wall, said second set of busbars being disposed substantially in alignment in a plane extending substantially parallel to said front wall between said first set of vertical busbars and said back wall;
   (e) a third set of three vertical busbars supported in said cubicle and extending substantially perpendicular to said bottom wall, said third set of vertical busbars being disposed substantially in alignment in a plane extending substantially parallel to said front wall between said second set of vertical busbars and said back wall;
   (f) three first adapter straps of conductive material, said first adapter straps each being bolted at one end to one of said terminals of said devices at one end and being bolted to one of said first set of vertical busbars at the other end;
   (g) three second adapter straps of conductive materials, said second adapter straps each being bolted at one end to one of said terminals of said devices at one end and being bolted to one of said second set of vertical busbars at the other end, whereby at least one of said sets of said device terminals is connected by said adapter straps to one of said first and second sets of vertical busbars, and
   (h) three third adapter straps of conductive material, said third adapter straps each being bolted at one end to one of said terminals of said devices at one end and being bolted to one of said third set of vertical busbars at the other end, whereby at least one of said sets of said device terminals is connected by said adapter straps to each of said first, second, and third sets of vertical busbars.

4. A prefabricated electrical switchboard comprising:
   (a) a generally rectangular metallic cubicle having generally planar front and back walls, opposed side walls and top and bottom walls;
   (b) a plurality of electrical devices supported in said cubicle adjacent said front wall, each of said electrical devices having a set of three in-coming terminals and a set of three out-going terminals at the back thereof within said cubicle;
   (c) a first set of three vertical electrical busbars supported in said cubicle and extending substantially perpendicular to said bottom wall in the space between said electrical devices and said back wall substantially in alignment in a plane parallel to said front wall;
   (d) a second set of three vertical electrical busbars supported in said cubicle and extending substantially perpendicular to said bottom wall, said second set of busbars being disposed substantially in alignment in a plane extending substantially parallel to said front wall between said first set of vertical busbars and said back wall;

(e) three first adapter straps of conductive material, said first adapter straps each being bolted at one end to one of said terminals of said devices at one end and being bolted to one of said first set of vertical busbars at the other end;

(f) three second adapter straps of conductive materials, said second adapter straps each being bolted at one end to one of said terminals of said devices at one end and being bolted to one of said second set of vertical busbars at the other end, whereby at least one of said sets of said device terminals is connected by said adapter straps to each of said first and second sets of vertical busbars, and (g) each of said vertical busbars having a right-angular cross-section and comprising first and second lengthwise portions extending substantially at right angles to each other, said vertical busbars being supported in said cubicle with one of said lengthwise portions extending substantially parallel to said front wall.

5. An electrical switchboard as set forth in claim 4 wherein each of said first and second lengthwise portions of said vertical busbars include a plurality of equally spaced holes therein disposed in a row extending lengthwise of said busbar throughout the major portion of the length of said busbar, said adapter straps being bolted to said vertical busbars by bolting means extending through said holes.

6. A prefabricated electrical switchboard comprising:
(a) a generally rectangular metallic cubicle having generally planar front and back walls, opposed side walls and top and bottom walls;
(b) a plurality of electrical devices supported in said cubicle adjacent said front wall, each of said electrical devices having a set of three in-coming terminals and a set of three out-going terminals at the back thereof within said cubicle;
(c) a first set of three vertical electrical conductors supported in said cubicle and extending substantially perpendicular to said bottom wall in the space between said electrical devices and said back wall substantially in alignment in a plane extending parallel to said front wall;
(d) a second set of three vertical electrical conductors supported in said cubicle and extending substantially perpendicular to said bottom wall, said second set of busbars being disposed substantially in alignment in a plane extending substantially parallel to said front wall between said first set of vertical conductors and said back wall;
(e) three first adapter straps of conductive material, said first adapter straps each being bolted at one end to one of said terminals of said devices at one end and being bolted to one of said first set of vertical conductors at the other end;
(f) three second adapter straps of conductive material, said second adapter straps each being bolted at one end to one of said terminals of said devices at one end and being bolted to one of said second set of vertical conductors at the other end, whereby at least one of said sets of said device terminals is connected by said adapter straps to one of said first and second sets of vertical conductors, and (g) each of said vertical electrical conductors comprising a pair of busbars each having a right-angle cross-section and comprising first and second lengthwise portions extending substantially perpendicular to each other, said pair of busbars being supported in juxtaposed relation with one of said lengthwise portions of each of said busbars closely adjacent and parallel to one of said lengthwise portions of the other of said busbars.

7. A prefabricated electrical switchboard comprising:
(a) a generally rectangular cubicle having generally planar front and back walls, opposed side walls, and top and bottom walls;
(b) a plurality of electrical control devices supported in said cubicle adjacent said front wall, each of said electrical devices having a plurality of terminals projecting therefrom within said cubicle;
(c) a plurality of electrical busbars supported in said cubicle between said electrical devices and said back wall and interconnecting said electrical device terminals, said electrical busbars each comprising an elongated busbar conductor having a generally right-angular cross-section comprising two lengthwise portions extending substantially perpendicular to each other.

8. An electrical switchboard as set forth in claim 7 wherein said right-angular cross-section busbars also include a plurality of equally spaced holes in each of said lengthwise portions extending lengthwise of said conductor.

9. A prefabricated electrical switchboard comprising:
(a) a generally rectangular cubicle having generally planar front and back walls, opposed side walls, and top and bottom walls;
(b) a plurality of electrical control devices supported in said cubicle adjacent said front wall, each of said electrical devices having a plurality of terminals projecting therefrom within said cubicle;
(c) a plurality of electrical conductors supported in said cubicle between said electrical devices and said back wall and connected to said electrical device terminals, each of said conductors comprising a pair of busbars each having a right-angle cross-section and comprising first and second lengthwise portions extending substantially perpendicular to each other, said pair of busbars being supported in juxtaposed relation with one of said lengthwise portions of each of said busbars closely adjacent and parallel to one of said lengthwise portions of the other of said busbars.

References Cited
UNITED STATES PATENTS

| | | | |
|---|---|---|---|
| 2,997,627 | 8/1961 | Ellegood | 174—88 |
| 2,999,190 | 9/1961 | Armandroff et al. | 317—120 |

ROBERT S. MACON, *Primary Examiner.*

ROBERT K. SCHAEFER, *Examiner.*

W. GARVERT, J. R. SCOTT, *Assistant Examiners.*